United States Patent [19]

Bartlett

[11] Patent Number: 5,201,782
[45] Date of Patent: Apr. 13, 1993

[54] UNIVERSALLY-ADJUSTABLE AXLE-MOUNTABLE TOOL FOR TRUING A BICYCLE WHEEL

[76] Inventor: Christopher B. Bartlett, 954 Lincoln Pl., Boulder, Colo. 80302

[21] Appl. No.: 888,978

[22] Filed: May 26, 1992

[51] Int. Cl.[5] ........................................... G01B 5/255
[52] U.S. Cl. .................................... 33/203.19; 33/203
[58] Field of Search ................. 33/203, 203.18, 203.19, 33/458, 533

[56] References Cited

U.S. PATENT DOCUMENTS

| | | | |
|---|---|---|---|
| 253,823 | 2/1882 | Myers | 33/203.19 |
| 306,502 | 10/1884 | Maul | 33/203.19 |
| 621,153 | 3/1899 | Schmidt | 33/203.19 |
| 640,607 | 1/1900 | Wardwell | 33/203.19 |
| 1,073,042 | 9/1913 | Heller | 33/203.19 |
| 1,240,528 | 9/1917 | Alsworth | 33/203.19 |
| 1,410,224 | 3/1922 | Schwartz | 33/203.19 |
| 1,450,518 | 4/1923 | Schwartz | 33/203.19 |
| 1,767,789 | 6/1930 | Garbs | 33/458 |
| 1,969,988 | 8/1934 | Neuberg | 33/458 |
| 3,490,148 | 1/1970 | Mathes | 33/458 |
| 3,792,511 | 2/1974 | Evans | 33/458 |
| 3,956,829 | 5/1976 | Moxon | 33/203.19 |
| 4,594,787 | 6/1986 | Nagano | 33/203.19 |

FOREIGN PATENT DOCUMENTS

| | | | |
|---|---|---|---|
| 605953 | 11/1934 | Fed. Rep. of Germany | 33/203 |
| 668900 | 12/1938 | Fed. Rep. of Germany | 33/203 |
| 448592 | 12/1948 | Italy | 33/203 |

Primary Examiner—William A. Cuchlinski, Jr.
Assistant Examiner—C. W. Fulton
Attorney, Agent, or Firm—John R. Flanagan

[57] ABSTRACT

A bicycle wheel truing tool includes a middle and two outer elongated rigid segments having the same lengths and shapes. The segments are pivotally connected together to permit erecting of the tool from a storage condition in which the segments are retracted to a nested relationship to an operational condition in which the segments are extended to an end-to-end relationship. The tool has a length in the storage condition which is about one-third that in the operational condition. Each tool segment is similarly progressively twisted along its longitudinal extent such that the opposite end portions of the segment lie in respective planes oriented in a generally transverse relationship to one another. The truing tool also includes a pair of releasably adjustable clamping mechanism pivotally connecting opposite end portions of the middle segment with adjacent end portions of the two outer segments. In the operational condition of the tool, one outer segment at one end portion thereof can be temporarily fixedly mounted to an end of the wheel axle. The clamping mechanisms can be released and retightened to adjustably pivot the middle segment and other outer segment relative to one another and to the one outer segment to place an end portion of the other outer tool segment having a reference edge defined thereon at a desired stationary position adjacent to the wheel rim to aid in visually gauging the trueness thereof.

19 Claims, 2 Drawing Sheets

UNIVERSALLY-ADJUSTABLE AXLE-MOUNTABLE TOOL FOR TRUING A BICYCLE WHEEL

BACKGROUND OF THE INVENTION

1. Field of the Invention

The present invention generally relates to truing bicycle wheels and the like and, more particularly, to an universally-adjustable axle-mountable tool for aiding in truing a bicycle wheel and the like.

2. Description of the Prior Art

Proper operation of a bicycle depends upon many factors. One of these factors is the degree of true of each wheel of the bicycle. While a bicycle is operated at low speeds, an out-of-true condition of a wheel will likely not cause a serious problem. However, at higher speeds, such a condition will cause vibration of the bicycle and impair caliper brake operation.

To correct an out-of-true condition it is necessary to adjust selected ones of the wheel spokes. Over the years, many different truing devices have been proposed in the prior patent art for use in conjunction with bicycle wheels as well as other kinds of spoked wheels to assist a person in carrying out this task. Prior patent art truing devices appear to fall in one of two categories. In the first category, the truing devices are mountable to the wheel axle. Representative of the first category are the truing devices disclosed in U.S. Pat. No. 253,823 to Myers, U.S. Pat. No. 1,240,528 to Alsworth, U.S. Pat. No. 1,410,224 to Schwartz, and Italian Pat. No. 448,592 to Campagnolo. In the second category, the truing devices are mountable to the wheel mounting fork. Representative of the second category are the truing devices disclosed in U.S. Pat. No. 621,153 to Schmidt, U.S. Pat. No. 640,607 to Wardwell, U.S. Pat. No. 1,073,042 to Heller, U.S. Pat. No. 3,956,829 to Moxon, German Pat. No. 605,953 to Preiber, and German Pat. No. 668,900 to Penn. While many of these prior art devices probably operated satisfactorily under the limited range of conditions for which they were designed, most devices appear to be rather cumbersome and tedious to adjust during use and too large and bulky to be carried by the person or in a tool kit.

Consequently, a need still exists for an improved wheel truing tool which will overcome the drawbacks of the prior art.

SUMMARY OF THE INVENTION

The present invention provides a wheel truing tool designed to overcome the above-described drawbacks and satisfy the aforementioned need. The wheel truing tool of the present invention is particularly suited for use in gauging and correcting out-of-true conditions of wheels having adjustable spokes and an axle with an end exposed so that one end of the truing tool can be temporarily mounted to the axle. The most widespread example of a vehicle using such wheels is a bicycle. The principles of the truing tool of the present invention can be applied to other types of vehicles using such wheels, such as tricycles, jogging strollers, etc., in addition to bicycles. Therefore, it will be understood and assumed that while only the term "bicycle" is used hereinafter for the sake of brevity, this term will be taken in the broad sense as meaning all vehicles adapted to use such wheels.

The truing tool of the present invention for aiding in truing of a bicycle wheel basically includes a plurality of substantially similar elongated segments and releasably adjustable means for pivotally connecting and clamping the segments to one another so as to permit articulating of the segments about a pair of spaced-apart transversely-extending axes relative to one another and erecting of the tool from a storage condition in which the segments are disposed in a retracted nested relationship with one another to an operational condition in which the segments are disposed in an extended end-to-end relationship with one another. In the retracted storage condition, the tool has a length being, at a maximum, approximately one-third of its length in the extended operational condition. Also, in the extended operational condition of the tool, one end of the tool temporarily mounts to an end of an axle of the wheel and the segments of the tool can be pivotally adjusted easily and quickly to place an opposite end of the tool at any desired stationary position adjacent to the tire or rim of the wheel for aiding in truing the wheel.

More particularly, the truing tool includes at least three elongated segments having substantially rigid structures and being of substantially the same lengths and shapes. Each segment is substantially similar in shape in that each segment is progressively twisted along its respective longitudinal extent such that opposite end portions of the segment lie in respective planes oriented in a generally transverse, and preferably perpendicular, relationship to one another. The segments are arranged to provide the truing tool with a middle segment and a pair of outer segments.

The truing tool also includes at least two releasably adjustable clamping mechanisms for pivotally and tightly connecting the opposite ends of the middle segment with the adjacent inner ends of the outer segments. In the extended condition of the truing tool, an outer end of one of the outer segments is configured to define a notch for temporarily mounting to an end of the wheel axle, whereas the outer end of the other of the outer segments is configured to define a protruding indicator ear having a straight edge by which the user can visually gauge the distance to the bicycle wheel as truing of the wheel is being carried out. With the one outer segment temporarily mounted to the wheel axle, each of the releasably adjustable clamping mechanisms can be selectively released and retightened to adjustably pivot the middle and other outer segments relative to one another and relative to the one outer segment in order to arrange them in a stationary positional relationship relative to one another that places the protruding ear on the outer end of the other outer segment at a desired stationary position adjacent to the tire or rim of the bicycle wheel.

Further, the opposite end portions of the middle segment and the inner ones of the opposite end portions of the outer segments have respective holes defined therethrough. Each clamping mechanism includes a coupling member extending through the hole in one of the opposite end portions of the middle segment and the hole in the inner one of the opposite end portions of one of the outer segments. The holes in the opposite end portions of the middle segment are internally-threaded. Each coupling member includes an elongated externally-threaded stem threaded through one of the internally-threaded holes in one of the opposite end portions of the middle segment and a head attached on one end of the stem for gripping to thread the stem through the hole. The head is larger in diameter than the stem and hole so as to abut against the one opposite end portion of the middle segment when the stem has been threaded tightly to the desired extent through the hole therein. Each clamping mechanism also includes a knob having a body for gripping by a user and an internally-threaded hole defined in the body and open at an exterior surface portion thereof for threadably receiving an opposite end of the stem to releasably and adjustably clamp the inner one of the opposite end portions of each outer segment to the opposite end portions of the middle segment.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figures 1, 2:
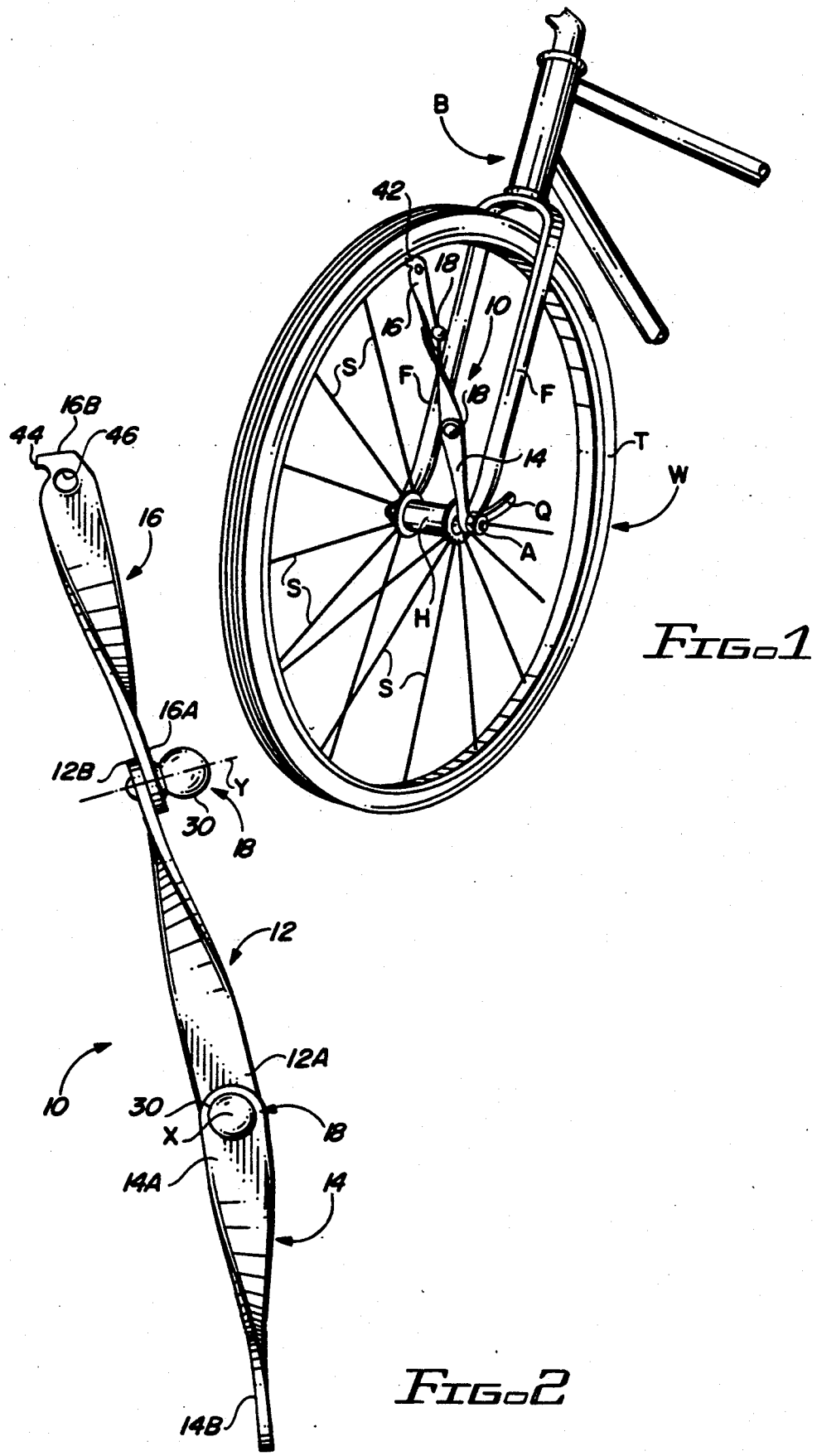
FIG. 1 is a perspective view of a wheel truing tool of the present invention being shown in an extended operational condition setup on a bicycle wheel ready for use to aid in correcting an out-of-true condition of the wheel.
FIG. 2 is a side elevational view of the wheel truing tool of FIG. 1 being shown removed from the bicycle wheel.
Figure 3:
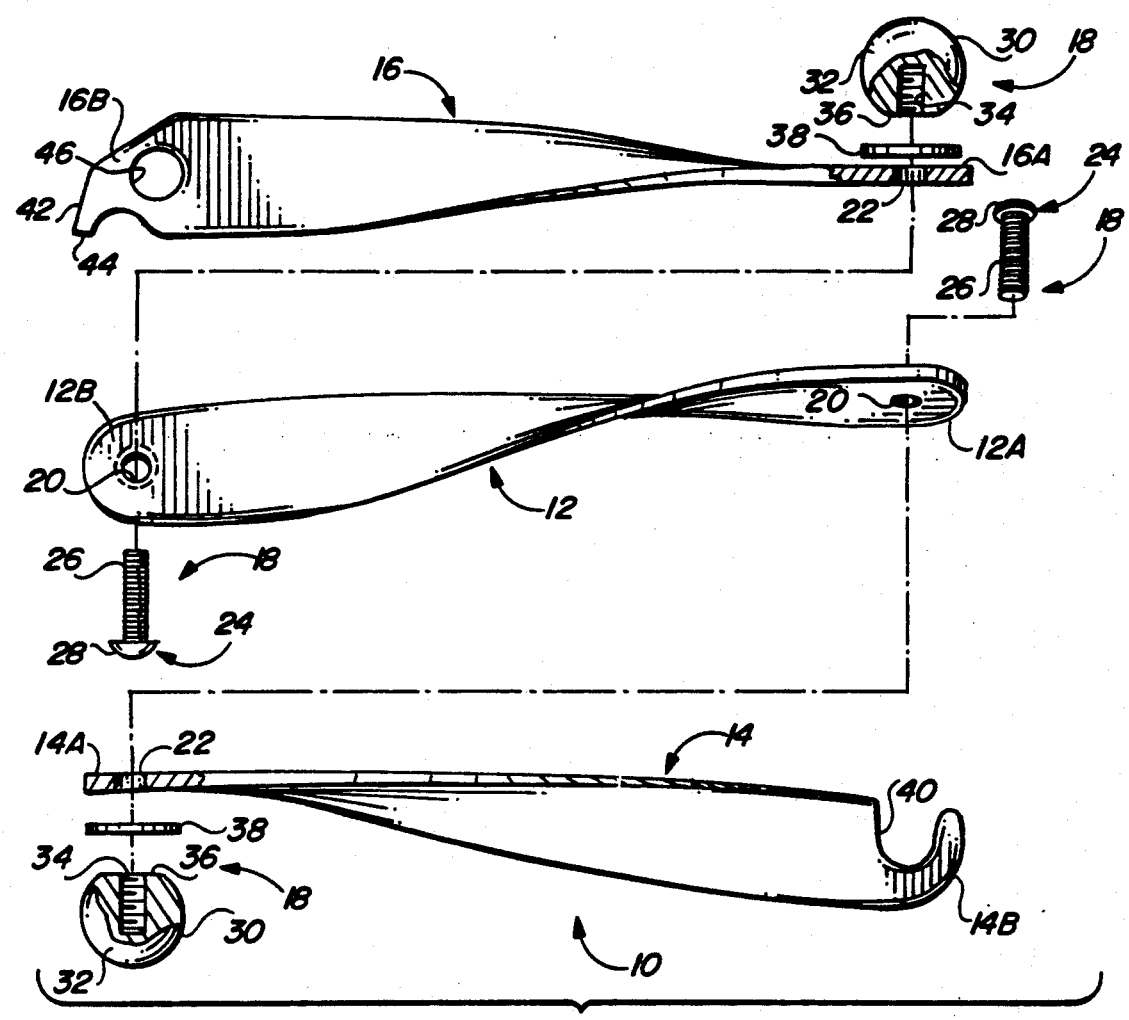
FIG. 3 is an exploded view of the wheel truing tool.

Referring to the drawings, and particularly to FIG. 1, there is illustrated a wheel truing tool of the present invention, being generally designated 10, for use to aid in the carrying out of truing a wheel W employed on a bicycle B or the like by making it easier and quicker to visually gauge and correct an out-of-true condition of the bicycle wheel W. The bicycle wheel W is of the type having a peripheral rim R mounting a tire T, a central axle A rotatably mounted through a hub H, and a plurality of elongated spokes S extending radially between and mounted at opposite ends to the peripheral rim R and central hub H. The opposite ends of the axle A are exposed so that one end of the truing tool 10 can be mounted to the one end of the axle A which receives a quick release lever mechanism Q to secure the opposite ends of the axle A to lower ends of a forward mounting fork F of the bicycle B. Truing of the wheel rim R is performed by rotatably adjusting individual ones of the spokes S so as to change their axial lengths and thereby force the rim R to assume as near perfect a circle as possible circumscribing the axle A.

Referring now to FIGS. 1–4, the wheel truing tool 10 basically includes at least three elongated segments arranged as a middle segment 12 and a pair of outer segments 14 and 16. The middle segment 12 and pair of outer segments 14, 16 have substantially the same lengths and shapes and are substantially rigid structures with respective pairs of opposite end portions 12A,12B, 14A,14B and 16A,16B. The middle segment 12 and pair of outer segments 14, 16 are similarly progressively and gradually twisted along their respective longitudinal extents, both lengthwise and widewise, such that their pairs of opposite end portions 12A,12B, 14A,14B and 16A,16B lie in respective different planes being oriented in generally transverse, and preferably perpendicular, relationships to one another.

Figure 4:
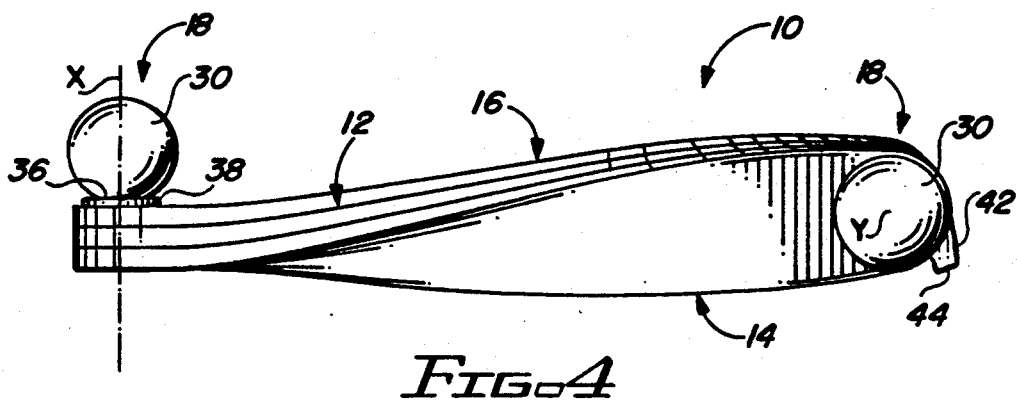
FIG. 4 is a side elevational view of the wheel truing tool in a retracted storage condition.

The wheel truing tool 10 also basically includes releasably adjustable clamping means in the form of a pair of clamping mechanisms 18. The clamping mechanisms 18 pivotally and tightly connect the opposite end portions 12A, 12B of the middle segment 12 with respective inner ones 14A, 16A of the opposite end portions of the outer segments 14, 16. Also, the clamping mechanisms 18 are releasably adjustable so as to permit the erecting of the truing tool 10 from a storage condition as shown in FIG. 4 in which the middle segment 12 and pair of outer segments 14, 16 are disposed in a retracted nested relationship with one another, to an operational condition as shown in FIGS. 1 and 2 in which the middle segment 12 and pair of outer segments 14, 16 are disposed in an extended end-to-end relationship with one another.

More particularly, the opposite end portions 12A, 12B of the middle tool segment 12 and the inner ones 14A, 16A of the opposite end portions of the outer tool segments 14, 16 have respective holes 20 and 22 defined therethrough. The holes 20 in the opposite end portions 12A, 12B of the middle segment 12 are internally-threaded, whereas the holes 22 in the inner ones 14A, 16A of the opposite end portions of the outer segments 14, 16 are not threaded.

Each clamping mechanism 18 includes a coupling member 24, preferably taking the form of a bolt, which extends through one of the holes 20 in the opposite end portions 12A 12B of the middle segment and one of the holes 22 in the inner ones 14A, 16A of the opposite end portions of the outer segments 14, 16. Each coupling member 24 has an externally-threaded stem 26 threaded through one of the internally-threaded holes 20 in one of the opposite end portions 12A, 12B of the middle segment 12 and an enlarged tool-element receiving head 28 attached on one end of the stem 26 for use in gripping the head 28 to turn and thread the stem 26 through the internally-threaded hole 20. The head 28 is larger in diameter than both the stem 26 and the hole 20 so that the head 28 will abut against the one of the opposite end portions 12A, 12B of the middle segment 12 when the coupling member 24 has been threaded and tightened to the desired extent into the hole 20 in the middle segment 12.

Further, each clamping mechanism 18 includes a knob 30 having a solid body 32 for gripping by a user' fingers and an internally-threaded hole 34 defined in the body 32. The internally-threaded hole 34 is open at an exterior surface portion 36 on the body 32 for threadably receiving the outer externally-threaded end portion of the stem 26 to releasably and adjustably clamp the inner one 14A, 16A of the opposite end portions of each outer segment 14, 16 to the opposite end portions 12A, 12B of the middle segment 12 irrespective of the particular articulated positional relationship or the middle and outer segments 12, 14, 16 with respect to one another. Also, preferably, each clamping mechanism 18 includes an annular bushing 38 disposed about the outer end portion of each of the stems 26 and adjacent the exterior surface portion 36 on the body 32 which preferably has a flattened profile.

Therefore, the tool 10 preferably includes the three segments 12, 14, 16 which are articulated with respect to one another about a pair of spaced-apart transversely-extending axes X and Y defined by the pair of clamping mechanisms 18, 20. Further, in view that the segments 12, 14, 16 are substantially equal in length, the tool 10 has an overall length in the retracted storage condition being, at a maximum, about one-third of its overall length in the extended operational condition. Thus, the tool 10 when in the storage condition is small enough in size, such as about five and one-half inches in length, to be readily carried in a tool kit on the bicycle.

In the extended operational condition of the truing tool 10, the outer one 14B of the opposite end portions of the one outer segment 14 of the tool 10 can be temporarily mounted to one end of the wheel axle A and the middle segment 12 and other outer segment 16 of the tool 10 can be pivotally adjusted easily and quickly to place the outer one 16B of the opposite end portions of the other outer segment 16 of the tool 10 at a desired stationary position adjacent to the rim R of the bicycle wheel W for aiding in truing of the wheel W. More particularly, the outer one 14B of the opposite end portions of the one outer segment 14 is configured to define a notch or cutout 40 for temporarily mounting to the end of the wheel axle A by preferably using the quick release lever mechanism Q, as seen in FIG. 1, when the tool 10 is disposed in the extended condition. On the other hand, the outer one 16B of the opposite end portions of the other outer segment 16 is configured to define an indicator thereon, such as protruding ear 42 having a straight edge 44, by which a user can visually gauge the distance to the bicycle wheel W from the straight edge 44 as truing of the wheel W is being carried out when the tool 10 is disposed in the extended condition. Further, when the segments 12, 14, 16 are in the retracted storage condition, one of the heads 28 protrudes into the notch 40, whereas the other of the heads 28 protrudes into an opening 46 formed through the outer one end portion 16B of the other outer segment 16 adjacent to the indicator ear 42.

In conclusion, the clamping mechanisms 18 pivotally and tightly connect the opposite end portions 12A, 12B of the middle tool segment 12 with the adjacent inner ones 14A, 16A of the opposite end portions of the outer tool segments 14, 16. With the one outer tool segment 14 temporarily mounted to the wheel axle A, the releasably adjustable clamping mechanisms 18 can be selectively released and retightened to permit the middle tool segment 12 and other outer tool segment 16 to be pivoted about the transverse axes X and Y relative to one another and relative to the one outer tool segment 14 in order to arrange them in a stationary positional relationship relative to one another that places the protruding ear 42 on the outer end portion 16B of the other outer tool segment 16 at a desired stationary position adjacent to the rim R of the bicycle wheel W for aiding in the performance of the truing of the wheel.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A tool for aiding in truing a bicycle wheel, said tool comprising:
   (a) at least three elongated segments having substantially the same lengths and shapes, each of said segments having a substantially rigid structure being similarly progressively twisted along the longitudinal extent thereof; and
   (b) releasably adjustable means for pivotally connecting and clamping said segments to one another so as to permit articulating of said segments about a pair of spaced-apart transversely-extending axes relative to one another and erecting of said tool from a storage condition in which said segments are disposed in a retracted nested relationship with one another to an operational condition in which said segments are disposed in an extended end-to-end relationship with one another.

2. A tool for aiding in truing a bicycle wheel, said tool comprising:
   (a) at least three elongated segments having substantially the same lengths and shapes, each of said segments having a pair of opposite end portions lying in respective planes oriented in a generally transverse relationship to one another; and
   (b) releasably adjustable means for pivotally connecting and clamping said segments to one another so as to permit articulating of said segments about a pair of spaced-apart transversely-extending axes relative to one another and erecting of said tool from a storage condition in which said segments are disposed in a retracted nested relationship with one another to an operational condition in which said segments are disposed in an extended end-to-end relationship with one another.

3. The tool of claim 2 wherein:
   each of said opposite end portions of one of said segments and one of said opposite end portions of each of the other of said segments has a respective hole defined therethrough; and
   said releasably adjustable means includes a pair of coupling members extending through said holes in said opposite end portions of said one segment and said holes in said ones of said opposite end portions of said other segments.

4. The tool of claim 3 wherein:
   said holes in said opposite end portions of said one segment are internally-threaded whereas said holes in said ones of said opposite end portions of said other segments are unthreaded; and
   each of said coupling members includes an elongated externally-threaded stem, said stems being threaded through said respective internally-threaded holes in said opposite end portions of said one segment, each coupling member also having a head attached on one end of said stem for gripping to thread said stem through said internally-threaded hole, said head being larger in diameter than said stem and said hole so as to abut against said one opposite end portion of said one segment when said stem has been threaded to the desired extent through said hole therein.

5. The tool of claim 4 wherein said releasably adjustable means includes a pair of knobs each having a body for gripping by a user and an internally-threaded hole defined in said body and open at an exterior surface portion thereof for threadably receiving an opposite end of said stem to releasably and adjustably clamp said inner ones of said end portions of said other segments to said opposite end portions of said one segment.

6. The tool of claim 2 wherein said respective planes of said opposite end portions of each of said segments are oriented substantially perpendicular to one another.

7. The tool of claim 2 wherein said segments are arranged as a middle segment and a pair of outer segments.

8. The tool of claim 7 wherein an inner one of said opposite end portions of each of said outer segments is located adjacent and pivotally connected by said releasably adjustable means to one of said opposite ends portions of said middle segment.

9. The tool of claim 8 wherein an outer one of said opposite end portions of one of said outer segments is configured to define a notch for temporarily mounting to an end of a wheel axle when said tool is disposed in said extended condition.

10. The tool of claim 9 wherein an outer one of said opposite end portions of the other of said outer tool segments is configured to define a protruding indicator ear having a straight edge thereon by which a user can visually gauge the distance to the bicycle wheel as truing of the wheel is being carried out when said tool is disposed in said extended condition.

11. The tool of claim 8 wherein:
said opposite end portions of said middle segment and said inner ones of said opposite end portions of said outer segments have respective holes defined therethrough; and
said releasably adjustable means includes a pair of coupling members each extending through said hole in one of said opposite end portions of said middle segment and said hole in said inner one of said opposite end portions of one of said outer segments.

12. The tool of claim 11 wherein:
said holes in said opposite end portions of said middle segment are internally-threaded; and
each of said coupling members includes an elongated externally-threaded stem threaded through one of said internally-threaded holes in one of said opposite end portions of said middle segment and a head attached on one end of said stem for gripping to thread said stem through said hole, said head being larger in diameter than said stem and said hole so as to abut against said one opposite end portion of said middle segment when said stem has been threaded to the desired extent through said hole therein.

13. The tool of claim 12 wherein said releasably adjustable means also includes a pair of knobs each having a body for gripping by a user and an internally-threaded hole defined in said body and open at an exterior surface portion thereof for threadably receiving an opposite end of said stem to releasably and adjustably clamp said inner ones of said end portions of said outer segments to said opposite end portions of said middle segment.

14. A tool for aiding in truing a bicycle wheel, said tool comprising:
(a) at least three elongated segments each having a pair of opposite end portions, each segment is a substantially rigid structure being similarly progressively twisted along a respective longitudinal extent such that said opposite end portions of said segment lie in respective planes oriented in a generally transverse relationship to one another, said segments being arranged as a middle segment and a pair of outer segments; and
(b) at least two clamping mechanisms, each clamping mechanism pivotally and tightly connecting said opposite end portions of said middle segment with respective inner ones of said opposite end portions of said outer segments so as to permit articulating of said segments relative to each other about a pair of spaced-apart transversely-extending axes and being releasably adjustable so as to permit erecting of said tool from a storage condition in which said segments are disposed in a retracted nested relationship with one another to an operational condition in which said segments are disposed in an extended end-to-end relationship with one another.

15. The tool of claim 14 wherein an outer one of said opposite end portions of one of said outer segments is configured to define a notch for temporarily mounting to an end of a wheel axle when said tool is disposed in said extended condition.

16. The tool of claim 15 wherein an outer one of said opposite end portions of the other of said outer tool segments is configured to define a protruding indicator ear having a straight edge thereon by which a user can visually gauge the distance to the bicycle wheel as truing of the wheel is being carried out when said tool is disposed in said extended condition.

17. The tool of claim 14 wherein:
said opposite end portions of said middle segment and said inner ones of said opposite end portions of said outer segments have respective holes defined therethrough; and
each said clamping mechanism includes a coupling member extending through said hole in one of said opposite end portions of said middle segment and said hole in said inner one of said opposite end portions of one of said outer segments.

18. The tool of claim 17 wherein:
said holes in said opposite end portions of said middle segment are internally-threaded; and
said coupling member includes an elongated externally-threaded stem threaded through one of said internally-threaded holes in one of said opposite end portions of said middle segment and a head attached on one end of said stem for gripping to thread said stem through said hole, said head being larger in diameter than said stem and said hole so as to abut against said one opposite end portion of said middle segment when said stem has been threaded to the desired extent through said hole therein.

19. The tool of claim 18 wherein each said clamping mechanism also includes a knob having a body for gripping by a user and an internally-threaded hole defined in said body and open at an exterior surface portion thereof for threadably receiving an opposite end of said stem to releasably and adjustably clamp said inner ones of said end portions of said outer segments to said opposite end portions of said middle segment.

* * * * *